US011304550B1

(12) United States Patent
Cosgarea et al.

(10) Patent No.: US 11,304,550 B1
(45) Date of Patent: Apr. 19, 2022

(54) TRAVEL TUMBLER FOR BEVERAGE DISPENSING

(71) Applicant: Fellow Industries, Inc., San Francisco, CA (US)

(72) Inventors: Andrew Cosgarea, San Francisco, CA (US); Yulian Bagirov, Middletown, RI (US)

(73) Assignee: Fellow Industries, Inc., San Francisco, CA (US)

( * ) Notice: Subject to any disclaimer, the term of this patent is extended or adjusted under 35 U.S.C. 154(b) by 43 days.

(21) Appl. No.: 16/716,418

(22) Filed: Dec. 16, 2019

Related U.S. Application Data

(60) Provisional application No. 62/896,300, filed on Sep. 5, 2019.

(51) Int. Cl.
| | | |
|---|---|---|
| *A47G 19/22* | (2006.01) | |
| *B65D 51/24* | (2006.01) | |
| *B65D 81/38* | (2006.01) | |
| *A47J 41/02* | (2006.01) | |

(52) U.S. Cl.
CPC ...... *A47G 19/2211* (2013.01); *A47G 19/2272* (2013.01); *A47G 19/2288* (2013.01); *A47J 41/028* (2013.01); *B65D 51/24* (2013.01); *B65D 81/3841* (2013.01)

(58) Field of Classification Search
CPC ............ A47G 19/2211; A47G 19/2272; A47G 19/2288; A47J 41/028; B65D 81/3841; B65D 81/3869
See application file for complete search history.

(56) References Cited

U.S. PATENT DOCUMENTS

| | | | | |
|---|---|---|---|---|
| 956,395 | A * | 4/1910 | Miller ..................... | A47J 41/02 |
| | | | | 215/12.1 |
| 2,828,043 | A * | 3/1958 | Hosford, Jr. .......... | A47J 41/028 |
| | | | | 220/592.22 |
| 3,096,897 | A * | 7/1963 | Hansen .............. | B65D 43/0212 |
| | | | | 215/12.2 |
| 3,313,447 | A * | 4/1967 | Spencer ............. | A47G 19/2211 |
| | | | | 220/719 |
| 3,360,160 | A * | 12/1967 | Spencer ............. | A47G 19/2211 |
| | | | | 220/719 |
| 3,549,044 | A * | 12/1970 | Lerner ............... | A47G 19/2211 |
| | | | | 220/719 |
| 5,971,202 | A * | 10/1999 | Filbrun .............. | A47G 19/2211 |
| | | | | 220/719 |

(Continued)

*Primary Examiner* — Don M Anderson
*Assistant Examiner* — Jennifer Castriotta
(74) *Attorney, Agent, or Firm* — Morgan, Lewis & Bockius LLP

(57) ABSTRACT

A beverage containment apparatus includes a cylindrical body, a lid, and a splash guard. The body has one or more walls, a sloping lip at an opening on one end, an interior portion of the body, and a base. In some embodiments, the sloped lip forms a circular arc or a parabolic arc. The lid has a closed end and an open end on an opposite side of the closed end. The open end is configured to detachably couple to the body. The splash guard is configured to detachably couple to the interior portion of the body proximate to the sloping lip. The splash guard includes a plurality of apertures spaced around an outer circumference of the splash guard. In some embodiments, the splash guard includes a center aperture sized to fit a user's finger.

18 Claims, 5 Drawing Sheets

(56) References Cited

U.S. PATENT DOCUMENTS

| | | | |
|---|---|---|---|
| 2011/0084084 A1* | 4/2011 | Berg | A47G 19/2272 220/703 |
| 2011/0309092 A1* | 12/2011 | Gatta | A47G 19/2205 220/703 |
| 2013/0032564 A1* | 2/2013 | Rosbach | B65D 81/3841 215/12.1 |
| 2017/0137176 A1* | 5/2017 | Gorbold | B65D 39/08 |

* cited by examiner though specific embodiments of the invention are disclosed herein, this application is not to be construed as being limited to these embodiments but includes modifications and variations thereto.

TRAVEL TUMBLER FOR BEVERAGE DISPENSING

CROSS-REFERENCE TO RELATED APPLICATIONS

This application claims priority to U.S. Provisional Application Ser. No. 62/896,300, filed Sep. 5, 2019, entitled "Carter Travel Tumbler," which is incorporated by reference herein in its entirety.

FIELD OF INVENTION

The present invention relates to portable containers for beverage consumption. More specifically, the invention relates to portable, insulated flasks ("travel tumblers") with a sharply tapered drinking rim (a "lip"), a watertight lid, and a splash prevention feature (a "splash guard").

BACKGROUND

Many people enjoy beverages and utilize travel mugs or tumblers to consume beverages (e.g., coffee) on the go (e.g., while commuting to work).

Conventionally, coffee is consumed in an open container such as a ceramic mug. These containers are typically open, and spill easily when moved. Additionally, these containers do not retain heat well. To address this issue, insulated travel tumblers have been designed with spill resistant lids and enhanced insulation.

However, conventional travel tumblers suffer drawbacks. A spill resistant lid typically has a small opening for liquid to pass through in order to aid in the spill resistance of the tumbler. Such a small opening prevents satisfying access to the beverage in combination with aroma and palate dispersal, which negatively affects flavor perception. Taste cannot be fully recognized in the absence of smell. For example, food taste and enjoyment is decreased when smell perception is blocked due to a stuffy nose. In addition, the construction of the drinking area/location affects the location of the tongue where the beverage hits. This is why wine glasses typically use thin, sharply tailored edges to aid in dispersing the liquid to the front of the tongue.

Therefore, a need exists for an insulated travel tumbler that resists spillage while still allowing access to aroma and palate dispersal.

SUMMARY

In accordance with some embodiments, a beverage containment apparatus includes a cylindrical body, a lid, and a splash guard. The cylindrical body has one or more walls, a sloping (tapered) lip at an opening on one end, an interior portion surrounded by the walls, and a base. The lid has a closed end and an open end opposite the closed end. The open end is configured to detachably couple to the body. The splash guard is configured to detachably couple to the interior portion of the body proximate to the sloping lip. The splash guard includes a plurality of apertures spaced around its outer circumference.

In some embodiments, the lid further includes one or more tracks or threads configured to couple with one or more protrusions of the body at the opening.

In some embodiments, the body has two walls forming an enclosed cavity, and the enclosed cavity has a layer of vacuum insulation.

In some embodiments, the splash guard includes a center aperture. In some embodiments, the center aperture is sized to fit a user's finger.

In some embodiments, the sloping lip is integrally formed with the body.

In some embodiments, the sloping lip forms a circular arc. In some embodiments, the sloping lip forms a parabolic arc.

In general, the beverage containment apparatus is used for dispensing beverages. The design and structure of disclosed embodiments prevent splashing while simultaneously allow a person to experience the aroma of the beverage in the apparatus.

BRIEF DESCRIPTION OF THE DRAWINGS

For a better understanding of the disclosed embodiments, reference should be made to the Description of Embodiments below, in conjunction with the following drawings, in which like reference numerals refer to corresponding parts throughout the figures.

DESCRIPTION OF EMBODIMENTS

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising" when used in this specification, specify the presence of the stated features, steps, operations, elements, and/or components, but do not preclude the presence or addition of one or more other features, steps, operations, elements, components, an/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and present disclosure and will not be interpreted in an idealized or overly formal sense unless expressly so defined herein.

In describing embodiments of the invention, it will be understood that a number of elements and/or features are disclosed. Each of these elements and/or features has an individual benefit and each can also be used in conjunction with the other elements and/or features. Accordingly, for the sake of clarity, this description will refrain from repeating every possible combination of the individual elements and/ or features in an unnecessary fashion. Nevertheless, the specification and claims should be read with the understanding that such combinations are entirely within the scope of the invention and claims.

New travel tumblers, and methods for use are discussed herein. In the following description, for the purposes of explanation, numerous specific details are set forth in order to provide a thorough understanding of the present invention. It will be evident, however, to one skilled in the art that the present invention may be practiced without these specific details.

Figure 1:
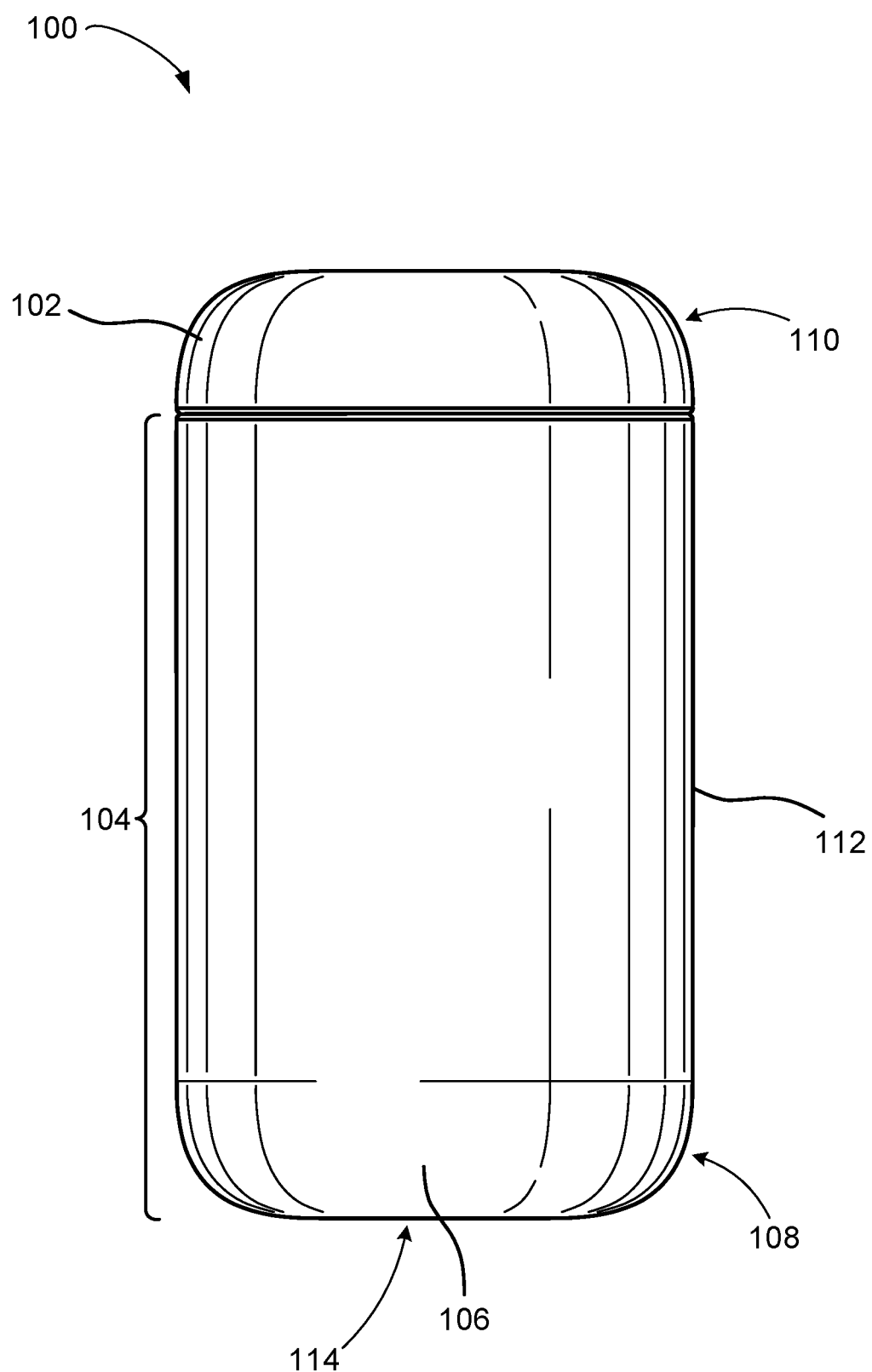
FIG. 1 provides a side view of a travel tumbler according to some embodiments.

FIG. 1 provides a side view of a travel tumbler 100 according to some embodiments of the present invention. The travel tumbler 100 includes a lid 102 and a body 104. The body 104 includes sidewalls 112 that form a generally cylindrical shape and a base 106 having a flat end 114 for upright stability. In some embodiments, the sidewalls 112 and the base are substantially hollow, enclosing an insulating material. In some embodiments, the hollow interior of the walls is substantially a vacuum to reduce the flow or heat across the walls (e.g., to keep a hot liquid beverage hot or a cold beverage cold). In some embodiments, the circumference of the lid 102 has a tapered arc 110 (e.g., circular, parabolic, or exponential). In some embodiments, the base 106 has a circumference that forms a tapered arc 108 (e.g., circular, parabolic, or exponential). In some embodiments, the tapered arc 108 for the base 106 is symmetrical to the tapered arc 110 for the lid.

Figure 2:
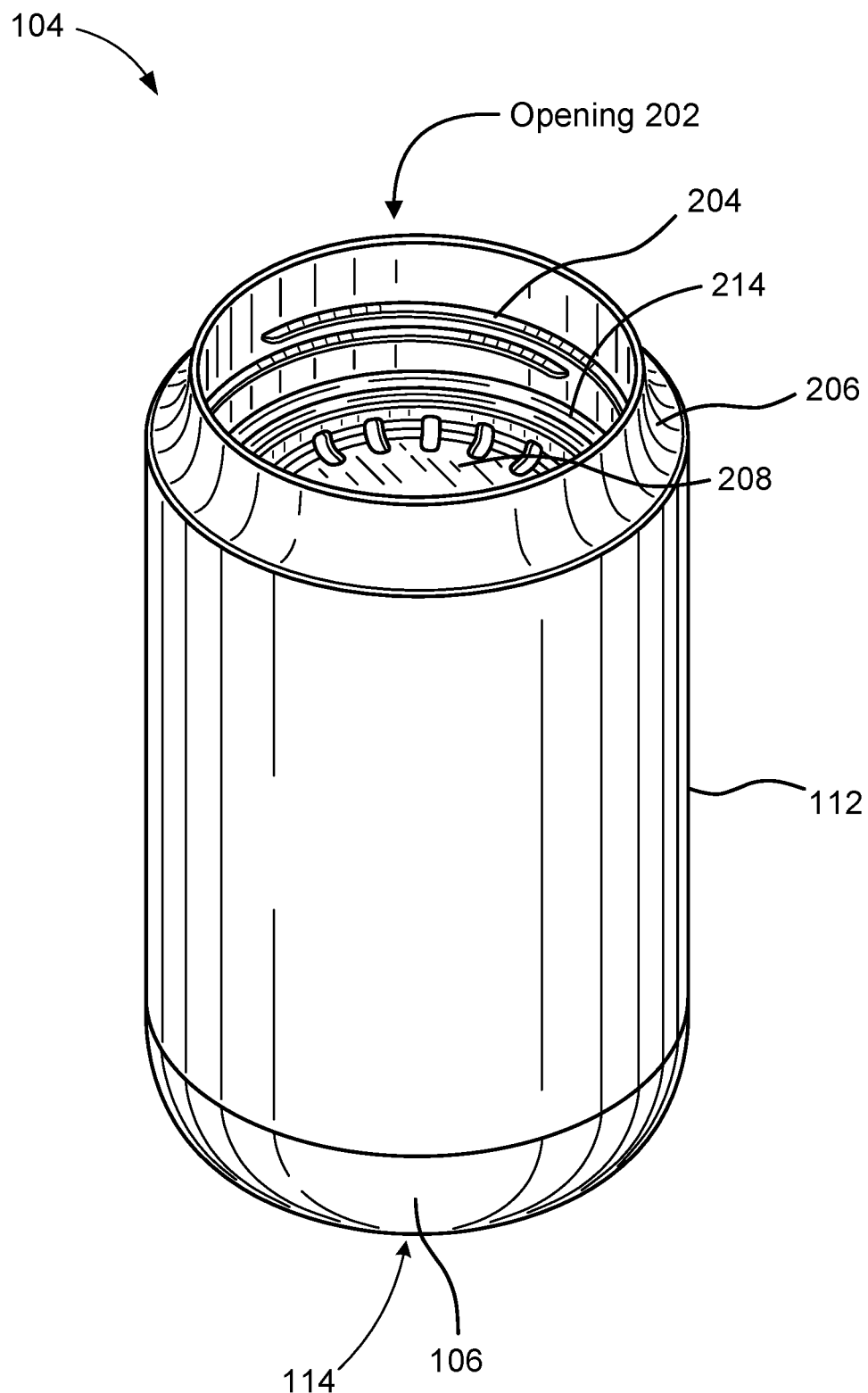
FIG. 2 provides an perspective view of a travel tumbler according to some embodiments.
Figure 4:
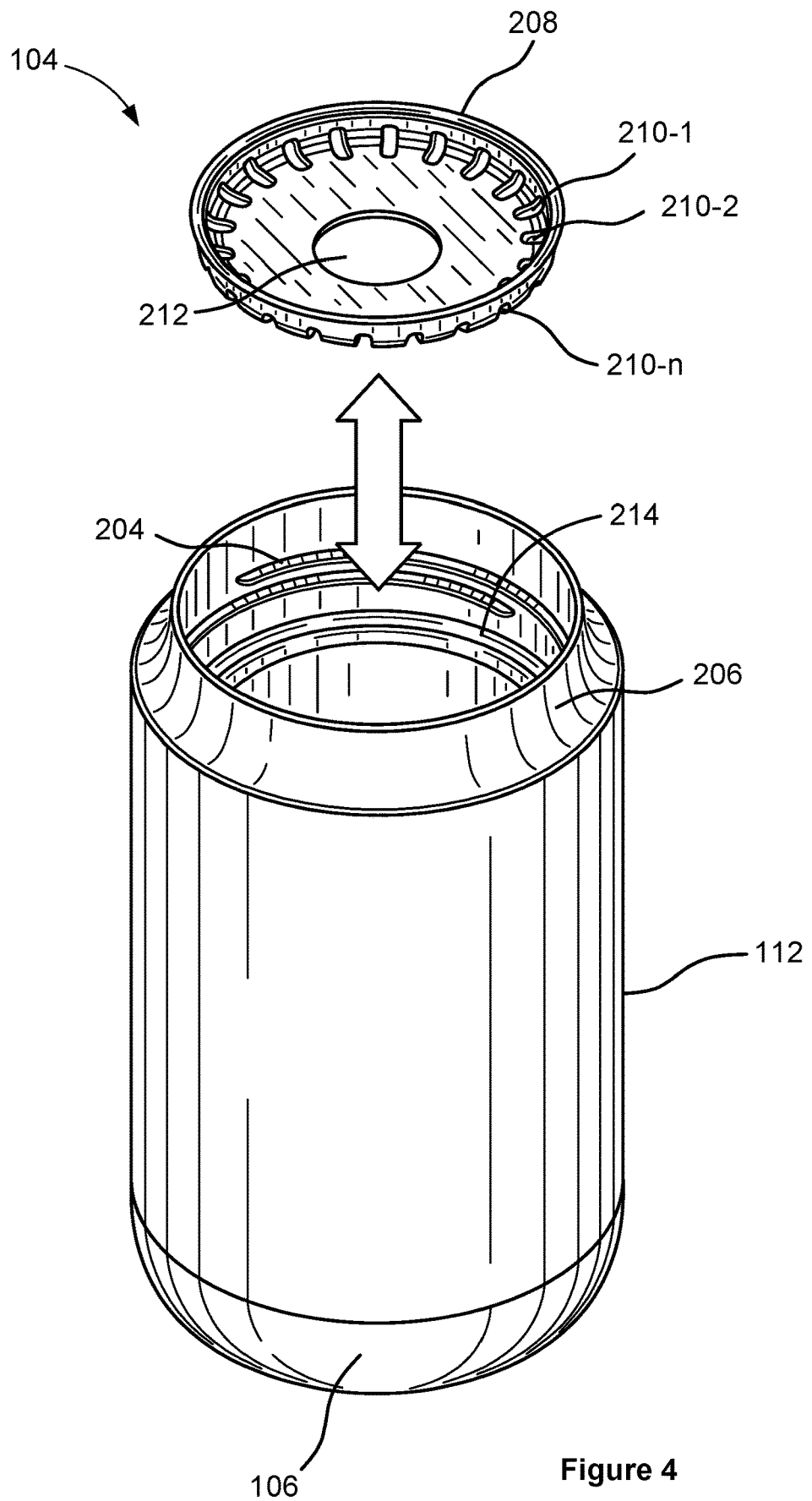
FIG. 4 provides an perspective view of a travel tumbler with the splash guard detached according to some embodiments.
Figure 5:
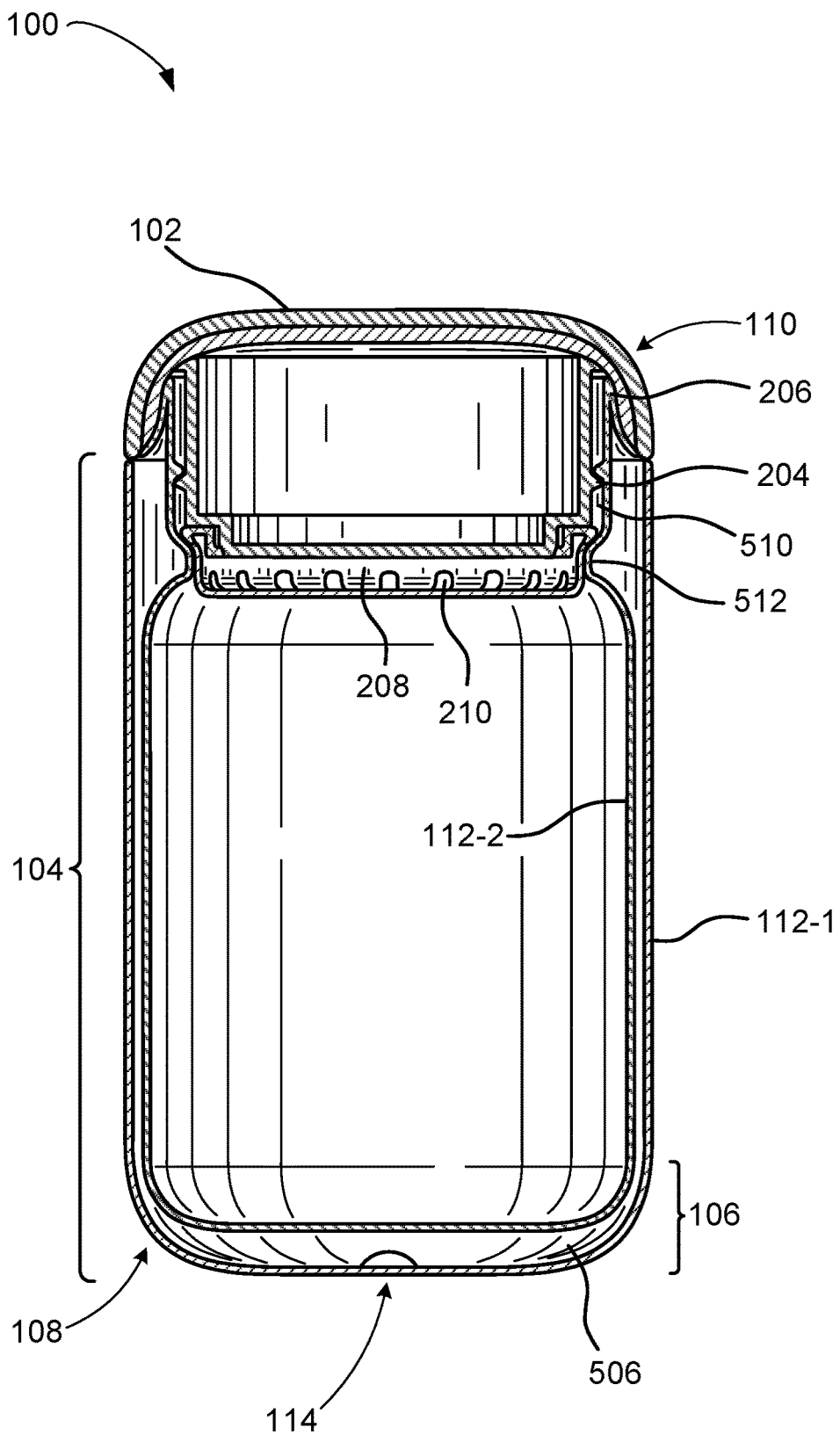
FIG. 5 provides a cross-sectional view of a travel tumbler according to some embodiments.

The lid 102 is detachably coupled to the body 104. In FIG. 1, the lid is shown coupled to the body 104, which hides the interior lip 206 of the base 104. (The lip is shown in FIGS. 2, 4, and 5.) In some embodiments, the travel tumbler is made of metal. In some embodiments, the travel tumbler is made of plastic. In some embodiments, the lid 102 is watertight.

FIG. 2 provides a perspective view of the body 104 of a travel tumbler 100 according to some embodiments. In FIG. 2 the body 104 is shown without the lid 102, exposing the opening 202. In some embodiments, the opening 202 has a radius that is substantially the same as the radius of the flat bottom 114 of the base 106. As shown previously in FIG. 1, the body 104 includes side walls 112 (e.g., a visible outer wall and an inner wall that is not visible). The opening 202 at the top is surrounded by a tapered lip 206. In some embodiments, the tapered lip is a circular arc, a parabolic arc, or an exponential arc.

Figure 3:
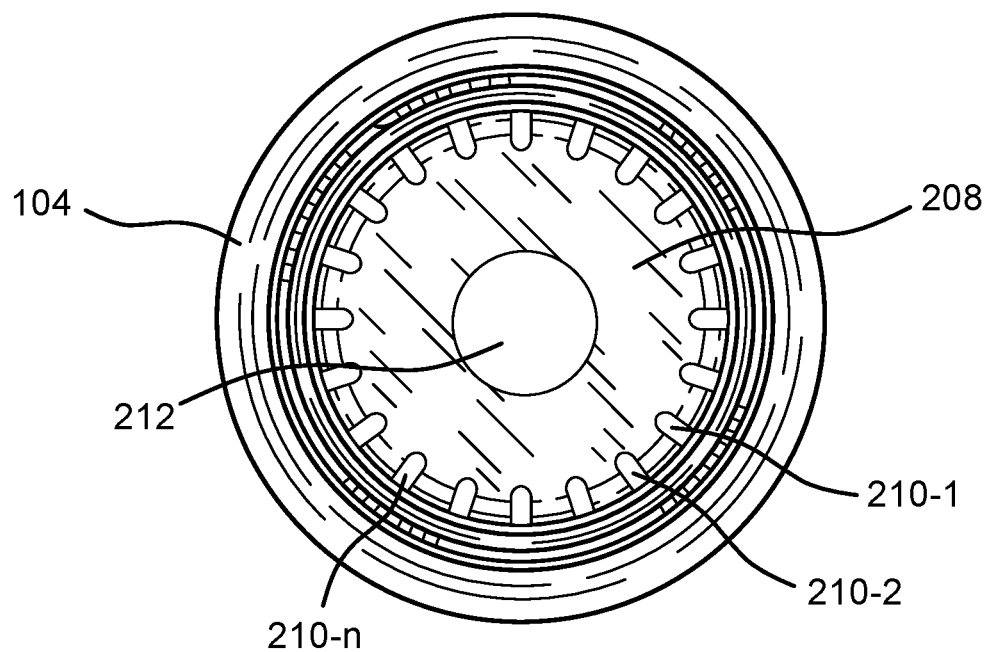
FIG. 3 provides a top view of a travel tumbler according to some embodiments.

In some embodiments, the inner wall of the lip 206 includes one or more tracks or threads 204 to securely connect the body 104 to the lid 102. In the interior of the body 104 is a detachable splash guard 208, which includes a plurality of circumferential apertures 210 and a central aperture. The apertures are illustrated in FIGS. 3 and 4. In some embodiments, the splash guard 208 is made of metal. In some embodiments, the splash guard 208 is retained by a groove 214 of the body 104 using a snap fit.

FIG. 3 provides a top view of the inside of a travel tumbler 100 without the lid 102 according to some embodiments. The illustrated embodiment includes a splash guard 208 retained near the opening 202 of the body 104. In some embodiments, the splash guard 208 is metallic, plastic, or any material suitable to withstand temperatures ranging from about 30° F. to about 200° F. As illustrated, the splash guard 208 includes a plurality of circumferential apertures 210 (e.g., the apertures 210-1, 210-2, . . . , 210-n, . . . ) and a larger central aperture 212. In some embodiments the central aperture 212 is sized to fit the finger of a person (e.g., having a diameter of 1.5 to 2 centimeters). This enables easy removal of the splash guard. The apertures 210 and 212 enhance perceived flavor of beverages in the tumbler 100.

FIG. 4 provides a perspective view of the body 104 of a travel tumbler 100, without the watertight lid according to some embodiments. In contrast to FIG. 2, the splash guard 208 in FIG. 4 has been detached from the remainder of the body 104. As illustrated, the opening 202 is formed by a sharply tapered lip 206. The splash guard 208 is shown with a plurality of small apertures 210-1 . . . 210-n around the circumference of the splash guard as well as a large central aperture 212. The central aperture 212 extends radially from the center of the splash guard 208. In some embodiments, the central aperture 212 accommodates a human finger, so that a user can easily detach the splash guard 208 from the body 104. In some embodiments, the splash guard 208 snaps into a groove 214 in the body 104.

FIG. 5 provides a cross-sectional view of a travel tumbler 100 according to some embodiments. In some embodiments the body 104 includes a double wall 112, which has an inner wall 112-2 and an outer wall 112-1. Some embodiments include an insulation layer 506 between the inner wall 112-2 and the outer wall 112-1. In some embodiments, the insulation 506 comprises an insulating material having a low coefficient of thermal conductivity. In some embodiments, the insulation 506 comprises a vacuum. Some embodiments use a combination of vacuum and an insulating material.

In some embodiments, the lid 102 mates with body 104 using threads or tracks 204. The sloped lip 206 of the body fits with a complementary shape in the lid 102. In some embodiments, a rubber seal 510 on the lid 102 compresses against a ridge 512 in the body to form a watertight seal. The splash guard 208 is retained below the rubber seal 510 and the ridge 512 so that the splash guard 208 does not interfere with the seal created by the compression of the rubber seal 510 and the ridge 512.

The cross-sectional view in FIG. 5 also illustrates the curved arcs 108 and 110 for the base 106 and the lid 102. At the bottom of the base 106 is a flat surface 114, enabling the tumbler 100 to remain stable in an upright position.

Embodiments of the disclosed tumbler 100 use a variety of materials, including plastics, rubbers, metals, woods, and other materials.

Although the present invention has been illustrated and described herein with reference to specific examples, it will be readily apparent to those of ordinary skill in the art that other embodiments can utilize the disclosed features in similar ways to achieve similar results. Such embodiments are within the spirit and the scope of the present invention, and are intended to be covered by the following claims.

What is claimed is:

1. A beverage containment apparatus, comprising:
   a cylindrical body having one or more walls, including:
      a sloping lip at an opening on one end;
      an interior portion of the body; and
      a base;
   a lid having a closed end and an open end on an opposite side of the closed end, wherein the open end is configured to detachably couple to the body; and
   a splash guard configured to detachably couple to the interior portion of the body proximate to the sloping lip, wherein the splash guard includes:
      a plurality of apertures spaced around an outer circumference of the splash guard;
      a disk portion that extends in a lateral direction; and
      an outer circumference portion that surrounds the disk portion, wherein the outer circumference portion extends toward the opening of the cylindrical body while the splash guard is coupled to the body.

2. The beverage containment apparatus of claim 1, wherein the lid further comprises:
one or more tracks configured to couple with one or more protrusions of the body at the opening.

3. The beverage containment apparatus of claim 1, wherein the body has two walls forming an enclosed cavity, and the enclosed cavity has a layer of vacuum insulation.

4. The beverage containment apparatus of claim 1, wherein the splash guard further comprises a center aperture.

5. The beverage containment apparatus of claim 4, wherein the center aperture is sized to fit a user's finger.

6. The beverage containment apparatus of claim 1, wherein the sloping lip is integrally formed with the body.

7. The beverage containment apparatus of claim 1, wherein the sloping lip forms a circular arc.

8. The beverage containment apparatus of claim 1, wherein the sloping lip forms a parabolic arc.

9. The beverage containment apparatus of claim 1, wherein the splash guard is coupled to the body by a groove in the body that holds a circumference of the splash guard so that a portion of the splash guard that is coupled to the groove in the body is disposed above the plurality of apertures while the splashguard is coupled to the body.

10. The beverage containment apparatus of claim 1, wherein the body includes a protruding ridge for coupling to the splash guard.

11. The beverage containment apparatus of claim 1, wherein at least a portion of each aperture of the plurality of apertures extends along the sidewall of the body when the splash guard is coupled to the body.

12. The beverage containment apparatus of claim 1, wherein the splash guard is composed of a material configured to withstand temperatures ranging from 30° F. to 200° F.

13. The beverage containment apparatus of claim 1, wherein the splash guard is composed of a metallic material.

14. The beverage containment apparatus of claim 1, wherein the splash guard is disc-shaped.

15. The beverage containment apparatus of claim 1, wherein the opening has a radius that is substantially the same as the radius of a flat bottom of the base.

16. The beverage containment apparatus of claim 1, wherein the splash guard is coupled to the body by a groove in the body using a snap fit.

17. The beverage containment apparatus of claim 1, wherein each of the apertures extends along the lateral direction and toward the opening of the cylindrical body while the splash guard is coupled to the body.

18. The beverage containment apparatus of claim 1, wherein the plurality of apertures are perforations.

* * * * *